(12) United States Patent
Lavitsky et al.

(10) Patent No.: US 6,688,838 B2
(45) Date of Patent: Feb. 10, 2004

(54) CLEANROOM LIFT HAVING AN ARTICULATED ARM

(75) Inventors: Ilya Lavitsky, San Francisco, CA (US); Michael Rosenstein, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 8 days.

(21) Appl. No.: 10/091,686

(22) Filed: Mar. 4, 2002

(65) Prior Publication Data

US 2003/0165378 A1 Sep. 4, 2003

(51) Int. Cl.$^7$ .............................................. B66C 23/00
(52) U.S. Cl. .................... 414/744.5; 248/129; 248/676; 269/17; 269/131; 384/563
(58) Field of Search .......................... 414/744.5; 269/9, 269/10, 76, 55, 17, 71, 130, 131; 254/2 B, 2 R, 287, 270; 248/129, 131, 141, 676; 384/563, 517

(56) References Cited

U.S. PATENT DOCUMENTS

| | | | | |
|---|---|---|---|---|
| 2,649,632 A | * | 8/1953 | Kessler .......................... 24/68 |
| 4,527,942 A | * | 7/1985 | Smith .......................... 414/590 |
| 4,634,331 A | | 1/1987 | Hertel .......................... 414/217 |
| 4,659,072 A | * | 4/1987 | La Rosa ....................... 269/17 |
| 5,076,205 A | | 12/1991 | Vowles et al. ............... 118/719 |
| 5,174,415 A | | 12/1992 | Neagle et al. ............... 187/9 R |
| 5,193,963 A | | 3/1993 | McAffee et al. ............... 414/5 |
| 5,280,983 A | | 1/1994 | Maydan et al. .......... 294/119.1 |
| 5,397,212 A | | 3/1995 | Watanabe et al. ........ 414/744.6 |
| 5,413,454 A | | 5/1995 | Movsesian .................... 414/729 |
| 5,503,513 A | | 4/1996 | Detriche ........................ 414/9 |
| 5,584,647 A | | 12/1996 | Uehara et al. ............ 414/744.5 |
| 5,588,789 A | | 12/1996 | Muka et al. ................. 414/217 |
| 5,857,826 A | | 1/1999 | Sato et al. ............... 414/744.6 |
| 6,068,704 A | | 5/2000 | Saeki et al. .................. 118/729 |
| 6,186,722 B1 | | 2/2001 | Shirai .......................... 414/217 |
| 6,203,582 B1 | | 3/2001 | Berner et al. ............... 29/25.01 |
| 6,478,272 B1 | * | 11/2002 | McKinsey et al. ....... 248/216.1 |

OTHER PUBLICATIONS

Alum–A–Lift, Inc., Web Page, www.alum–a–lift. com.
Design Proposal from Alum–A–Lift, Inc., Jan. 21, 2001.

* cited by examiner

*Primary Examiner*—Donald W. Underwood
(74) *Attorney, Agent, or Firm*—Moser, Patterson & Sheridan

(57) ABSTRACT

A cleanroom lift for maneuvering large objects such as turbomolecular pumps utilized in semiconductor processing applications is provided. In one embodiment, the lift includes a vertically movable carriage coupled to a linkage assembly. The linkage assembly has a first link and a second link. Each link has one piece construction to minimize deflection under load. The first link is coupled to the carriage by a carriage shaft assembly and to the second link by a linkage shaft assembly. The second link is coupled to the linkage shaft assembly and a gripper assembly. Optionally, a third link and second shaft assembly may be disposed between the gripper assembly and the second link to minimize the weight of the links to facilitate assembly in cleanroom environments.

17 Claims, 9 Drawing Sheets ated arm.

CLEANROOM LIFT HAVING AN ARTICULATED ARM

BACKGROUND OF THE INVENTION

1. Field of the Invention

The embodiments of the invention generally relate to a lift having an articulated linkage assembly.

2. Background of the Related Art

Articulated linkage assemblies have long been utilized for moving objects and/or providing a mechanical advantage. In its simplest form, an articulated linkage assembly consists of a first linkage rotatably coupled to a second linkage. The movement of the second linkage relative to the first linkage provides a range of motion that can be utilized, for example, to move an object held in a gripper coupled to the second linkage. Examples of such linkages are commonly found in robotic applications, wherein the movement between the linkages is controlled by actuators such as pneumatic cylinders or electric motors. Alternatively, the relative movement of the linkages may be controlled manually.

Although the use of articulated linkages is widespread, the utilization of conventional articulated linkages in cleanroom applications presents special problems. For example, actuators, bearings and linkages often introduce particulate into the cleanroom that may adversely affect semiconductor wafer processing. Additionally, articulated linkages commonly utilized to move large and/or heavy objects are bulky and cumbersome and pose a threat of damaging delicate semiconductor processing equipment through incidental contact. Moreover, the erection, use and disassembly of such articulated linkages utilized to maneuver heavy objects within the cleanroom often requires multiple personnel due to the weight and complexity of the linkage assembly and disassembly process. In light of the sensitivity to particle generation associated with persons in the cleanroom and the time and expense associated with having persons engaged in activity within the cleanroom, the minimization of personnel required to erect, operate and disassemble such linkages within the cleanroom is highly desirable.

Therefore, there is a need for an improved articulated linkage for cleanroom applications.

SUMMARY OF THE INVENTION

A cleanroom lift for maneuvering large objects such as turbomolecular pumps utilized in semiconductor processing applications is provided. In one embodiment, a cleanroom lift includes a vertically movable carriage coupled to a linkage assembly. The linkage assembly has a first link and a second link. Each link has one piece construction to minimize deflection under load. The first link is coupled to a carriage shaft assembly and a linkage shaft assembly. Both shaft assemblies have preloaded bearings. The second link is coupled to the linkage shaft assembly and a gripper assembly. Optionally, the gripper assembly is coupled to a third link by a second shaft assembly to minimize the weight of the links to facilitate assembly and disassembly in cleanroom environments. The coupling of the links is generally facilitated through the use of shaft clamps that allow the bearings and shaft assemblies to remained aligned when disassembled. This allows the linkage assembly to be easily disassembled, transported and assembled by one person thereby facilitating use in a cleanroom environment.

BRIEF DESCRIPTION OF THE DRAWINGS

A more particular description of the invention, briefly summarized above, may be had by reference to the embodiments thereof, which is illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE PREFERRED EMBODIMENT

Figure 1:
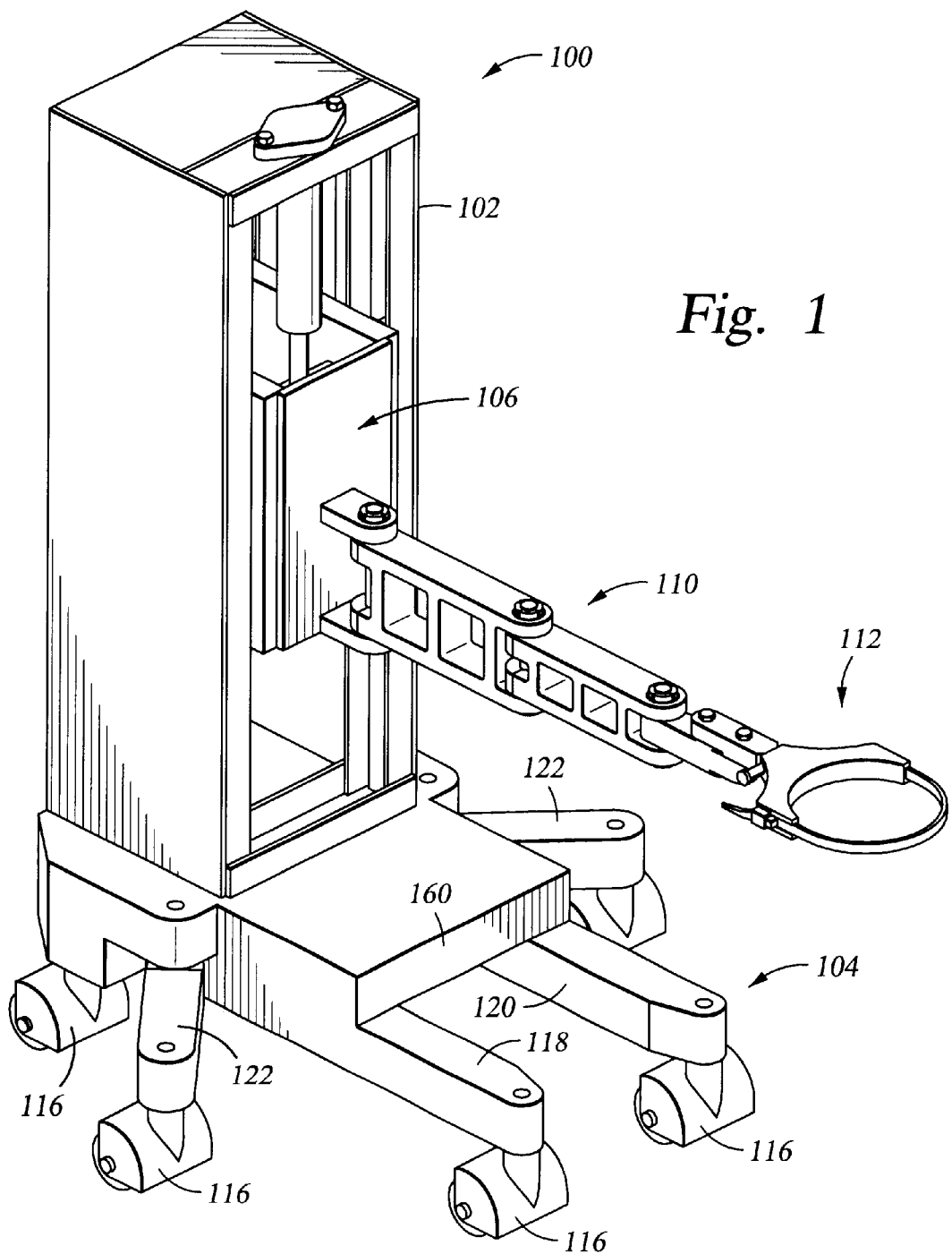
FIG. 1 depicts a perspective view of a lift having one embodiment of an articulated linkage assembly.

FIG. 1 depicts a perspective view of one embodiment of a jack stand or lift assembly 100. The lift assembly 100 generally includes a vertically positionable carriage 106 coupled to a linkage assembly 110. The linkage assembly 110 is coupled to a gripper assembly 112. The linkage assembly 110 is adapted to move the gripper assembly 112 through a horizontal range of motion to facilitate positioning an object held by the gripper assembly 112.

The lift assembly 100 additionally includes a horizontal base 104 coupled to a vertical support assembly 102. The base 104 is configured to prevent the lift assembly 100 from tipping when the gripper assembly 112 is subject to a load. The base 104 generally includes a first base member 118 and a second base member 120 disposed parallel in a spaced-apart relation. The base members 118, 120 may be optionally coupled by one or more traverse members 160 to add rigidity to the base 104.

The base members 118, 120 may also comprise a plurality of casters 116 coupled thereto to facilitate movement of the lift assembly 100. Typically, one or more of the casters 116 include a locking mechanism (not shown) that prevents the lift assembly 100 from unintentionally moving.

Figure 2:
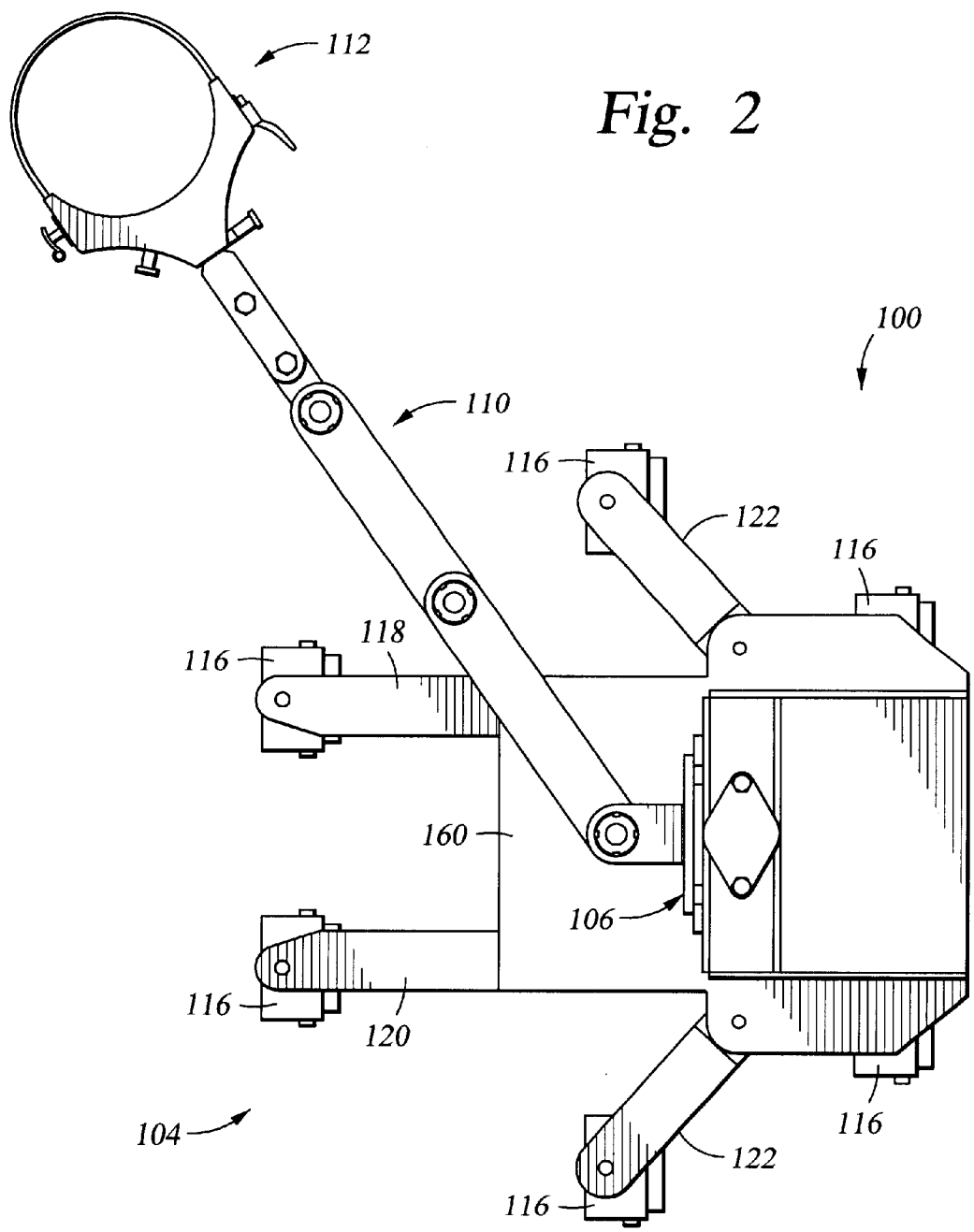
FIG. 2 depicts a top view of the lift of FIG. 1.

As seen in FIGS. 1 and 2, an optional set of outriggers 122 may be coupled to the base members 118, 120. The outriggers 122 may be rotated horizontally from each base member 118, 120 to stabilize the lift assembly 100 when under loads lateral to the orientation of the base members 118, 120. The outriggers 122 may additionally include castors 116 for facilitating movement of the lift assembly 100.

Figure 3:
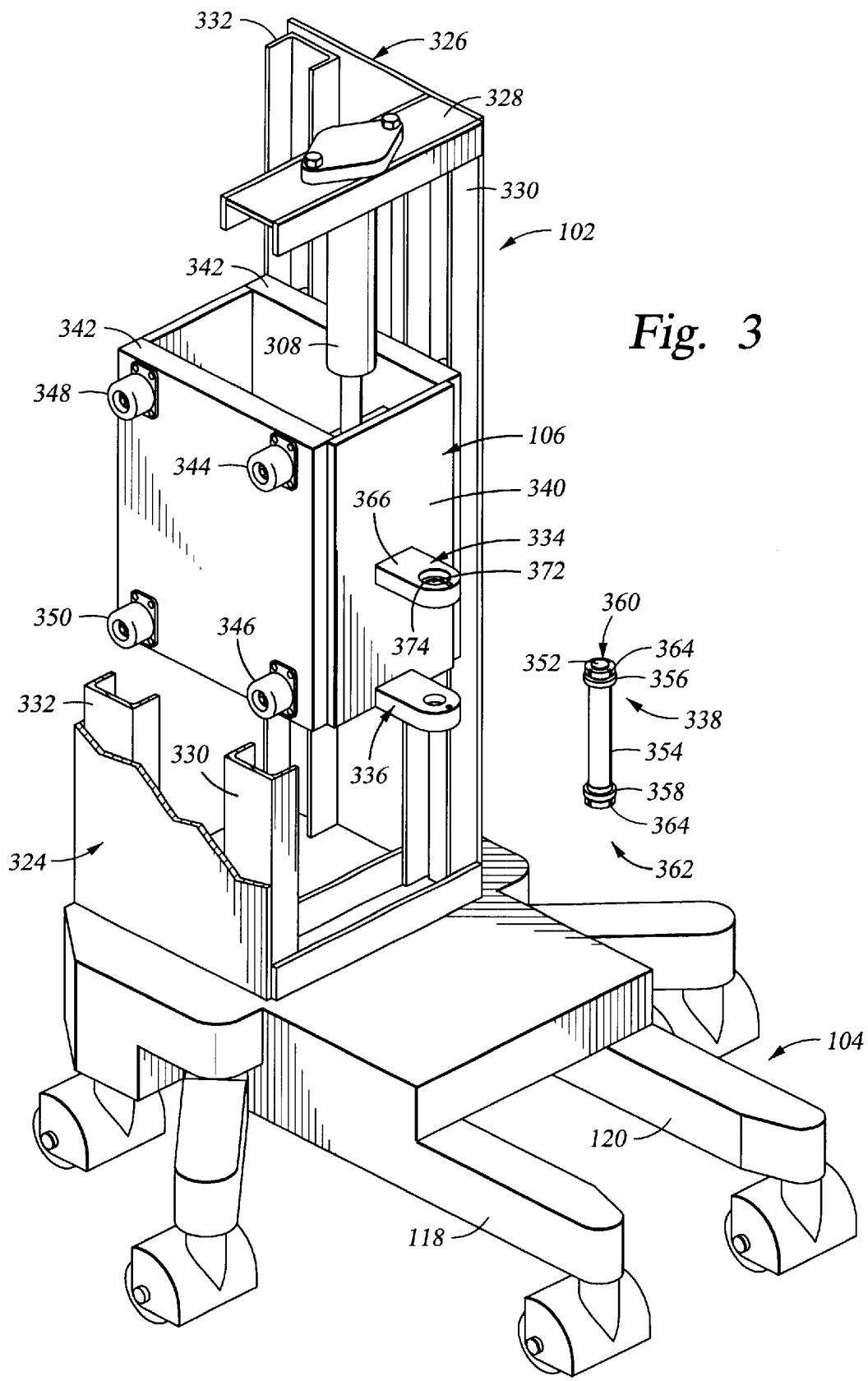
FIG. 3 depicts a partially exploded, sectional vies of the lift of FIG. 1.

Referring to FIG. 3, the vertical support assembly 102 is rigidly fastened to the base members 118, 120 and/or the traverse member 160. The vertical support assembly 102 generally includes a first guide 324 and a second guide 326 maintained in a parallel, spaced-apart relation by a cap plate 328 coupled between the upper ends of the guides 324, 326. The lower ends of the guides 324, 326 are respectively coupled to the base members 118, 120 and/or the traverse member 160.

Each guide 324, 326 generally includes a mechanism that facilitates the vertical movement of the carriage 106 along the vertical support assembly 102. The mechanism may be a shaft and bearing, a sliding dove-tail, a traveler and car and the like. In the embodiment depicted in FIG. 3, each guide 324, 326 has a inwardly facing, inner guide rail 330 and outer guide rail 332 that interfaces with bearings (discussed below) disposed on the carriage 106 to allow the carriage 106 to move vertically without deflection or binding while under load.

The carriage 106 is movably coupled to the vertical support assembly 102 by an actuator 308. The actuator 308 controls the elevation of the carriage 106 along the vertical support assembly 102. The actuator 308 may be manually or electronically controlled and may be a pneumatic cylinder, hydraulic cylinder, ball screw, lead screw, belt and motor, rack and pinion or other device for facilitating linear displacement. In the embodiment depicted in FIG. 3, the actuator 308 is a manually operated hydraulic pump coupled to the cap plate 328.

The carriage 106 generally includes a face plate 340 having a guide plate 342 coupled at opposing ends. The guide plates 342 are generally disposed parallel to one another and configured to fit between the first and second guides 324, 326 of the vertical support assembly 102. Each guide plate 342 includes a plurality of bearings that interface with the inner and outer guide rails 330, 332. In the embodiment depicted in FIG. 3, each guide plate 342 includes a first upper bearing 344 and a first lower bearing 346 that are vertically aligned and positioned to interface with the inner guide rail 330 of the guide 324, 326. A second upper bearing 348 and a second lower bearing 350 are disposed on the guide plates 342 and are orientated parallel to the first upper and lower bearing 344, 346. The second upper and lower bearings 348, 350 generally interface with an outer guide rail 332 of the guides 324, 326. The bearings 344, 346, 348 and 350 may be solid, ball and/or roller bearings.

A vertically aligned upper mounting bracket 334 and a lower mounting bracket 336 are generally centrally disposed on the face plate 340. A carriage shaft assembly 338 extends between the upper mounting bracket 334 and the lower mounting bracket 336 and facilitates coupling of the linkage assembly 110 to the carriage 106.

The carriage shaft assembly 338 generally includes a central shaft 352 having a center portion 354 having a larger diameter than a first and second end 360, 362. A preloaded upper bearing 356 and a preloaded lower bearing 358 are pressed over the respective ends 360, 362 of the shaft 352 and abut against the center portion 354. The bearings 356 and 368 are typically tapered roller bearings configured to carry both axial and radial loads. A first end 360 of the shaft 352 extends beyond the center portion 354 and the upper bearing 356 through the upper mounting bracket 334. A second end 362 of the shaft 352 extends beyond the center portion 354 and the lower bearing 358 through the lower mounting bracket 336. Shaft retainers, nuts or shaft collars 364 are coupled to the first and second ends 360, 362 of the shaft 352 to hold the bearing 356, 358 against the center portion 354 and to prevent vertical movement of the shaft 352 between the mounting brackets 334, 336.

The upper mounting bracket 334 generally includes a body 366 having a hole 372 formed therein that is adapted to receive the shaft 352 of the carriage shaft assembly 338. A counterbore 374 formed in the hole 372 and is configured to receive an outer race of the upper bearing 356, thus allowing the shaft 352 to rotate relative to the carriage 106. The body 366 is coupled to the face plate 340 typically by fasteners (not shown). The lower mounting bracket 336 generally receives the lower bearing 358 of the carriage shaft assembly 338 proximate the lower mounting bracket 336 in a similar fashion. The linkage assembly 110 is generally coupled to the shaft 352 to prove a first range of motion relative to the carriage 106 in a desired plane (e.g., horizontal).

FIGS. 4A–D and 5 depict exploded side and top views of the linkage assembly 110. The linkage assembly 110 generally includes a first link 402 that may be coupled to the carriage shaft assembly 338, a second link 404 coupled to the first link 402 and a third link 406 coupled between the second link 404 and the gripper assembly 112. A first linkage shaft assembly 408 pivotally couples the first and second links 402, 404 thereby facilitating a second range of motion typically with the plane of the first range of motion provided in the carriage shaft assembly 338. A second linkage shaft assembly 410 pivotally couples the second and third links 404, 406, thereby facilitating a third range of motion, typically co-planar with the first and second ranges of motion. A wrist 412 couples the third linkage and the gripper assembly 112. The wrist 412 may be fixed (as shown) or pivot to allow the gripper assembly 112 to rotate relative the linkage assembly 110. The three links 402, 404, 406 of the linkage assembly 110 generally allow the gripper assembly 112 to be maneuvered over a desired range of motion while minimizing the weight and size of the individual links to facilitate assembly and disassembly by a single person.

Figure 4A:
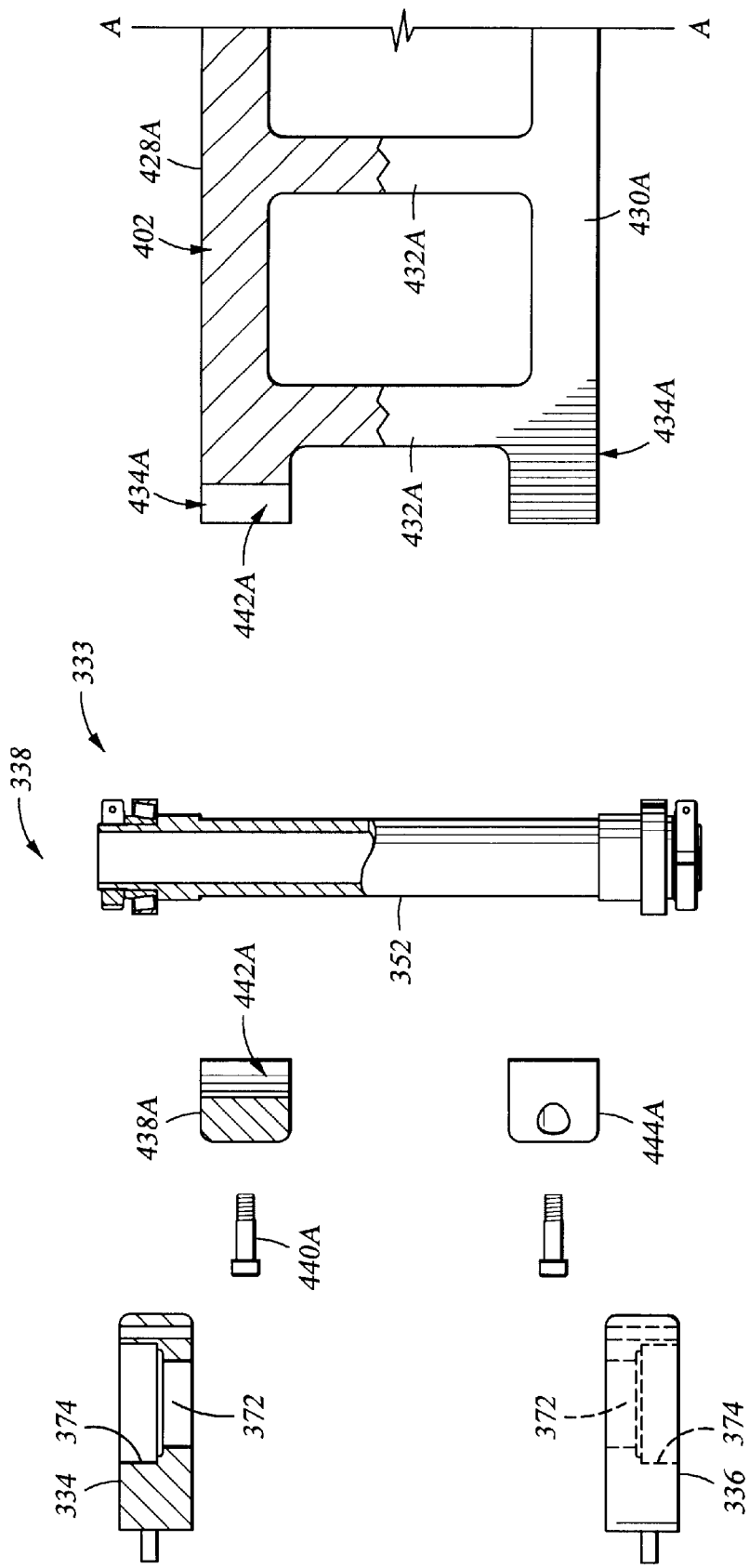
FIGS. 4A–D depicts an exploded view of the linkage assembly of FIG. 1.
Figure 4B:
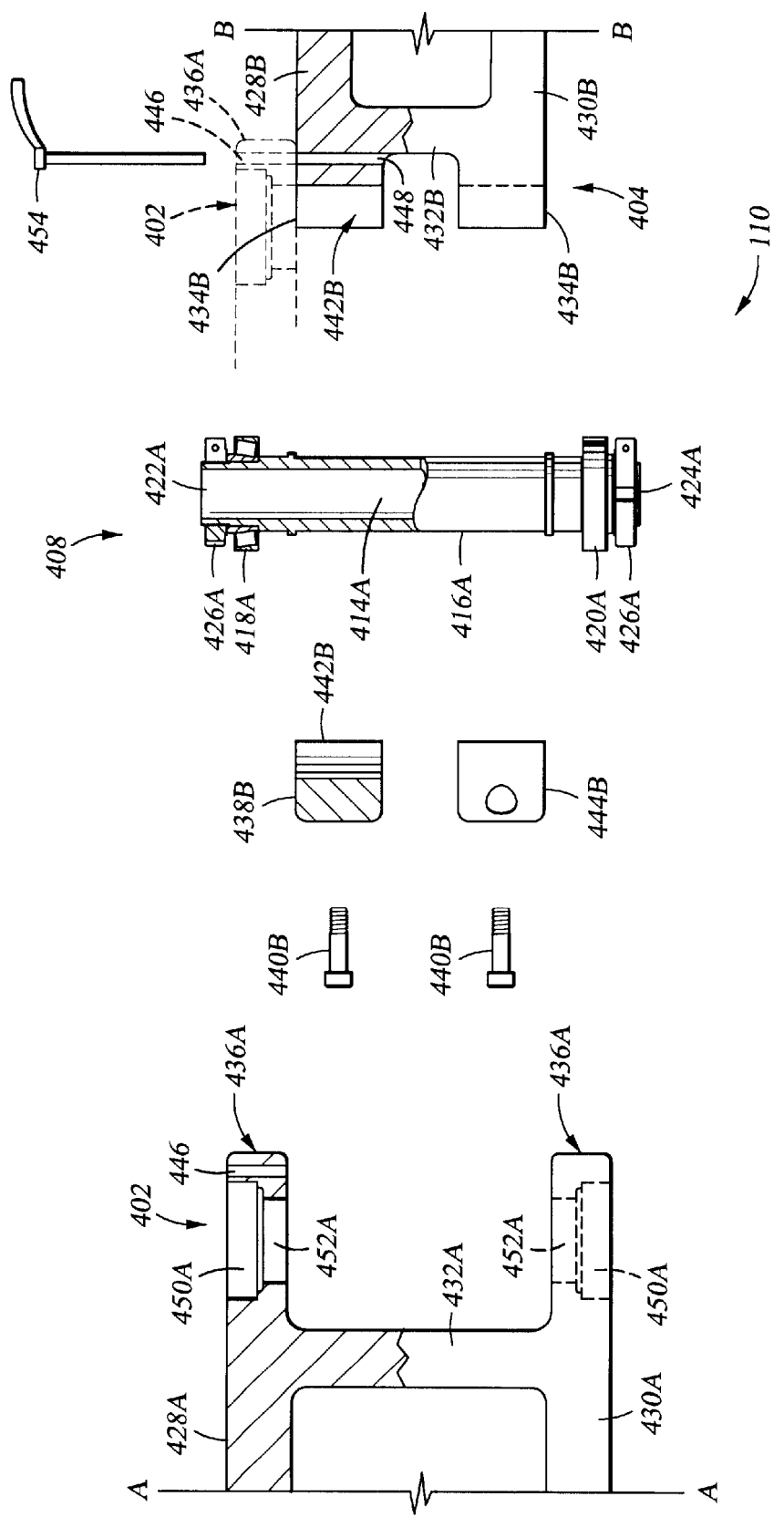

One embodiment of the first linkage shaft assembly 408 is depicted in FIG. 4B. The first linkage shaft 408 assembly generally includes a shaft 414A having a stepped center region 416A having a larger diameter than the first and second ends 422A, 424A of the shaft assembly 408. The shaft 414A may be solid or hollow and is typically comprised of a metal or other high strength material, such as steel. A preloaded upper bearing 418A and a preloaded lower bearing 420A are pressed onto the respective ends 422A, 424A of the shaft 414A. The bearings 418B, 420B are typically tapered roller bearings to carry both axial and radial loads. The first end 422A of the shaft 414A extends beyond the upper bearing 418A through a portion of the first link 402. A second end 424A of the shaft 414A extends beyond the lower bearing 420A through another portion of the first link 402. Shaft collars 426A typically are coupled to the first and second ends 422A, 424A of the shaft 414A to retain the bearings 418A, 420A against the center region 416A and to prevent vertical movement of the first linkage shaft 408 assembly relative to the first link 402.

Figure 4C:
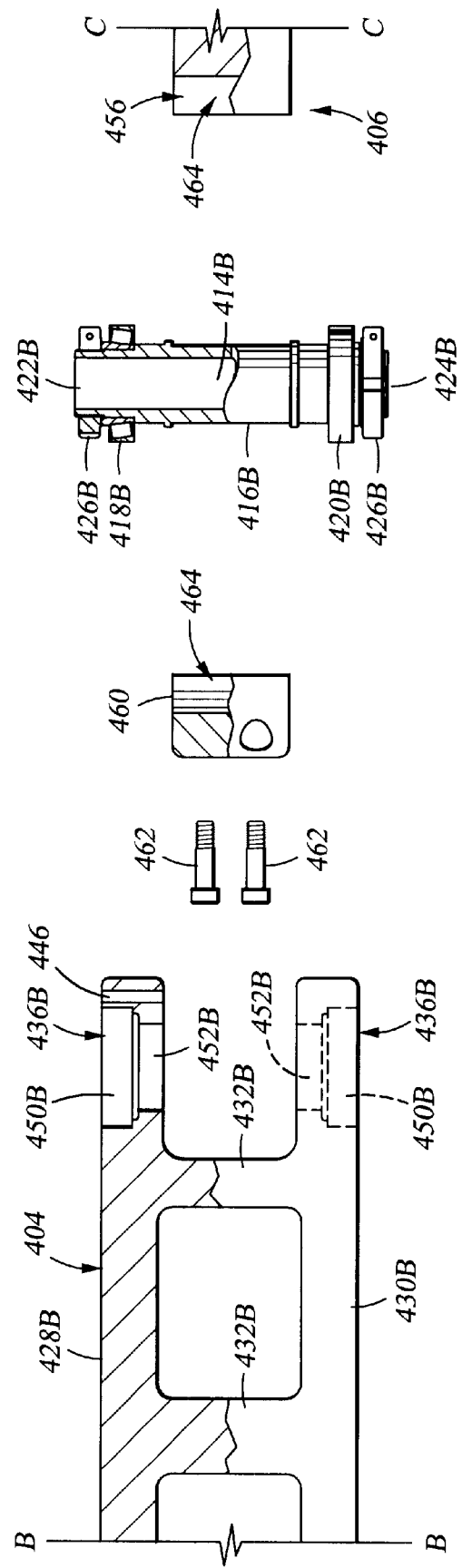

One embodiment of the second linkage shaft assembly 410 is depicted in FIG. 4C and is generally similar to the first linkage shaft assembly 408. The second linkage shaft assembly 410 generally includes a central shaft 414B having a stepped center region 416B having a larger diameter than first and second ends 422B, 424B of the shaft 414B. A preloaded upper bearing 418B and a preloaded lower bearing 420B are disposed on the respective ends 422B, 424B of the shaft 414B. The bearings 418B, 420B are typically tapered roller bearing to enhance rotation under both axial and radial loads. The first end 422B of the shaft 414B extends beyond the upper bearing 418B through a portion of the second link 404. The second end 424B of the shaft 416B extends beyond the lower bearing 420B through another portion of the second link 404. Shaft collars 426B typically are coupled to the first and second ends 422B, 424B of the shaft 416B to retain the bearings 418B 420B against the center region 416B to prevent vertical movement of the second linkage shaft assembly 410 relative to the second link 404.

The first link 402 generally comprises an upper member 428A and a lower member 430A coupled by one or more transverse members 432A (two are shown). The upper, lower and transverse members 428A, 430A, 432A are typically fabricated from a singular body of material to minimize deflection. The upper and lower members 428A, 430A each include a first end 434A and a second end 436A that extend outward of the transverse member 432A.

As depicted in FIG. 4A, the first ends 434A of the upper and lower members 428A, 430A form parts of a shaft clamp that secures the linkage assembly 110 to the carriage shaft assembly 338. The first end 434A of the upper member 428A has an upper first end cap 438A coupled thereto by a plurality of fasteners 440A. The adjacent surfaces of the first end 434A and the upper first end cap 438A each have a portion of a hole 442A formed therethrough that is adapted to receive the shaft 352 of the carriage shaft assembly 338. The hole 442A is typically configured as slightly less than a half circle having a radius substantially equal to that of the center portion 354 of the shaft 352 so that the upper first end cap 438A and first end 434A of the first link 402 clamp the carriage shaft assembly 328 when fastened together. The first end 434A of the lower member 430A mates with a lower first end cap 444A in a similar fashion to clamp the shaft 352 proximate the lower member.

The spaced-apart relation of the upper and lower first end caps 438A, 444A provides stability and minimizes deflection in the linkage assembly 110. Alternatively, the upper and lower end caps 438A, 444A may be combined into a single structure. Advantageously, the end caps 438A, 444A may be readily removed by a single person, thereby separating the linkage assembly 110 from the carriage plate 106 without having to remove, loosen or otherwise disturb the carriage shaft assembly 338 from the main portion of the lift assembly 100.

Referring to FIG. 4B, the second ends 436A of the upper and lower member 428A, 430A generally include a bearing receiving pocket that rotationally secures the first linkage shaft assembly 408 thereto. The second end 436A of the upper member 428A has a hole 452A formed therein that is adapted to receive the upper bearing 418A or the first linkage shaft assembly 408. Each portion of the hole 452A formed in the second end 436A includes a counterbore 450A. The counterbore 450A receives the upper bearing 418A and allows the shaft 414A to moving in rotate in the hole 450A. The second end 436A of the lower member 430A retains the lower bearing 420A in a similar fashion to rotationally secure the shaft 414A of the first linkage shaft assembly 408 proximate the lower member 430A.

The angular orientation between the first and second links 402, 404 may be fixed at a desired position. A fixing means may be utilized to prevent rotation between the linkages 402, 404. the means may allow infinite resolution, for example, by increasing the frictional torque to retain an angular position. One example of such a means is a screw disposed through the first link that may be advanced to urge against the second hook, thereby providing the links 402, 404 may be restrained at a predetermined angle. For the embodiment depicted in FIG. 4B, the first link includes one or more holes 446 formed therethrough at predetermined intervals. When linkages 402, 404 are orientated at one of the predetermined angles, a pin 454 may be inserted through one of the holes 446 in the first link 402 that is in alignment with a hole 448 formed in the second link 404. Optionally, the retaining means may be utilized between any of the linkages 402, 404, 406.

Referring to FIGS. 4B–C, the second link 404 generally comprises an upper member 428B and a lower member 430B coupled by one or more transverse members 432B. The upper, lower and transverse members 428B, 430B, 432B are typically fabricated from a singular body of material to minimize defection. The upper and lower members 428B, 430B each include a first end 434B and a second end 436B that extend outward of the transverse members 432B.

The first ends 434B of the upper and lower members 428B, 430B form a shaft clamp that secures the second link 404 to the center region 416A of the first shaft assembly 408. The first end 434B of the upper member 428B has an upper first end cap 438B coupled thereto by a plurality of fasteners 440B. The adjacent surfaces of the first end 434B and the upper first end cap 438B each have a portion of a hole 442B formed therein that is adapted to clamp the center region 418A of the first shaft assembly 408. The hole 442B has a radius substantially equal to that of the sleeve 418A and is configured as slightly less than a half circle so that the upper first end cap 438B and first end 434B of the second link 404 clamp the center region 416A of the shaft 414A when fastened together. The first end 434B of the lower member 430B mates with a lower first end cap 444B in a similar fashion to clamp the sleeve 416A proximate the lower member 430B.

The second ends 436B of the upper and lower member 428B, 430B generally include a bearing receiving pocket that rotationally secures the second linkage shaft assembly 410 thereto. The second end 436B of the upper member 428B has a hole 452B formed therein that is adapted to receive the upper bearing 418B or the second linkage shaft assembly 410. Each portion of the hole 452B formed in the second end 436B and the upper second end cap 438B includes a counterbore 450B. The counterbore 450B is configured to receive the outer race of the upper bearing 418B. The counterbore 452B additionally prevents the upper bearing 418B and shaft 414B from moving in through the hole 452B. The second end 436B of the lower member 430B includes a hole 452B and counterbore 450B that receives the outer race of the lower bearing 420B of the second linkage shaft assembly 410 to rotationally retain the shaft assembly 410 proximate the lower member 430B in a similar fashion.

Figure 4D:
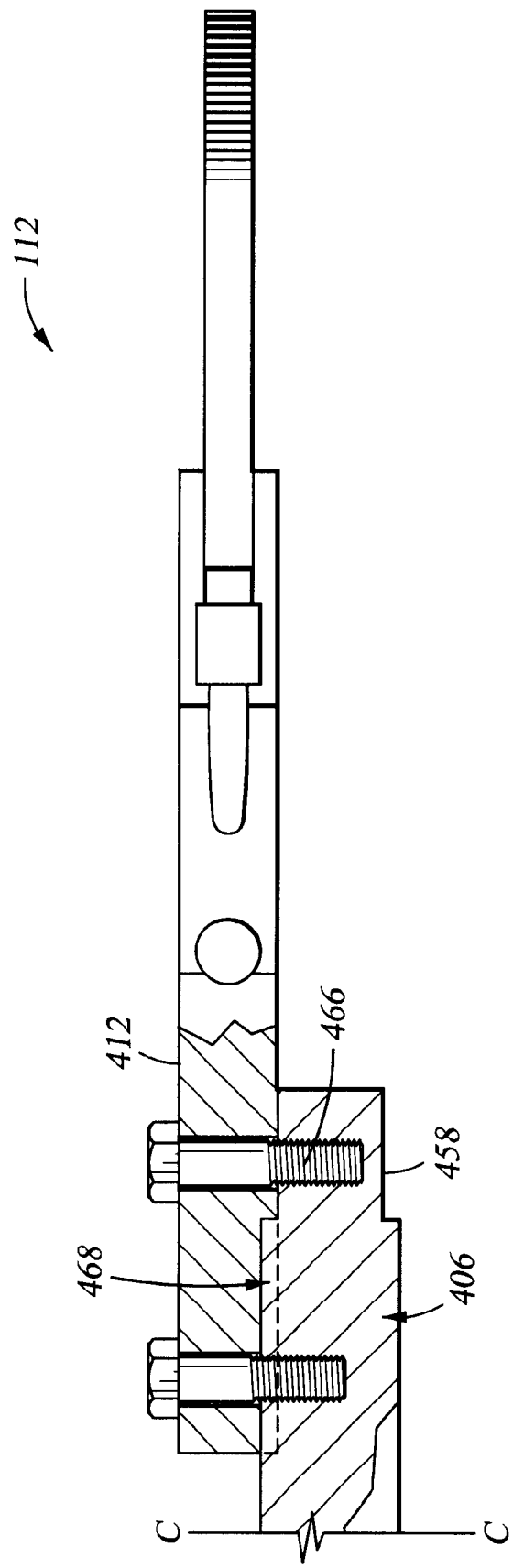

Referring to FIGS. 4C and 4D, the third link 406 generally comprises a single member having a first end 456 that couples to the second linkage shaft assembly 410 and a second end 458 that couples to the gripper assembly 112. The first end 456 has an end cap 460 coupled thereto that secures the third link 406 to the sleeve 416B of the second linkage shaft assembly 410. The end cap 460 is typically coupled to the third link 406 by a plurality of fasteners 462. The adjacent surfaces of the first end 456 and the end cap 460 each have a portion of a hole 464 formed therein that is adapted to receive the counter region 416B of the second linkage shaft assembly 410. The hole 464 has a radius substantially equal to that of the sleeve 416B and is configured as slightly less than a half circle so that the end cap 460 and first end 456 of the third link 406 clamp the sleeve 416B when fastened together.

The second end 458 of the third link 406 generally interfaces with the gripper assembly 112. The gripper assembly 112 may be fastened to the third link 406 in a variety of methods. In the embodiment depicted in FIG. 4D, the gripper assembly 112 is fastened to the third link 406 by a plurality of pins or bolts 466. Typically, a key 468 is formed between the wrist 412 and the second end 458 of the third link 406 that locates and prevents movement of the gripper assembly 112 relative the linkage assembly 110.

Figure 5:
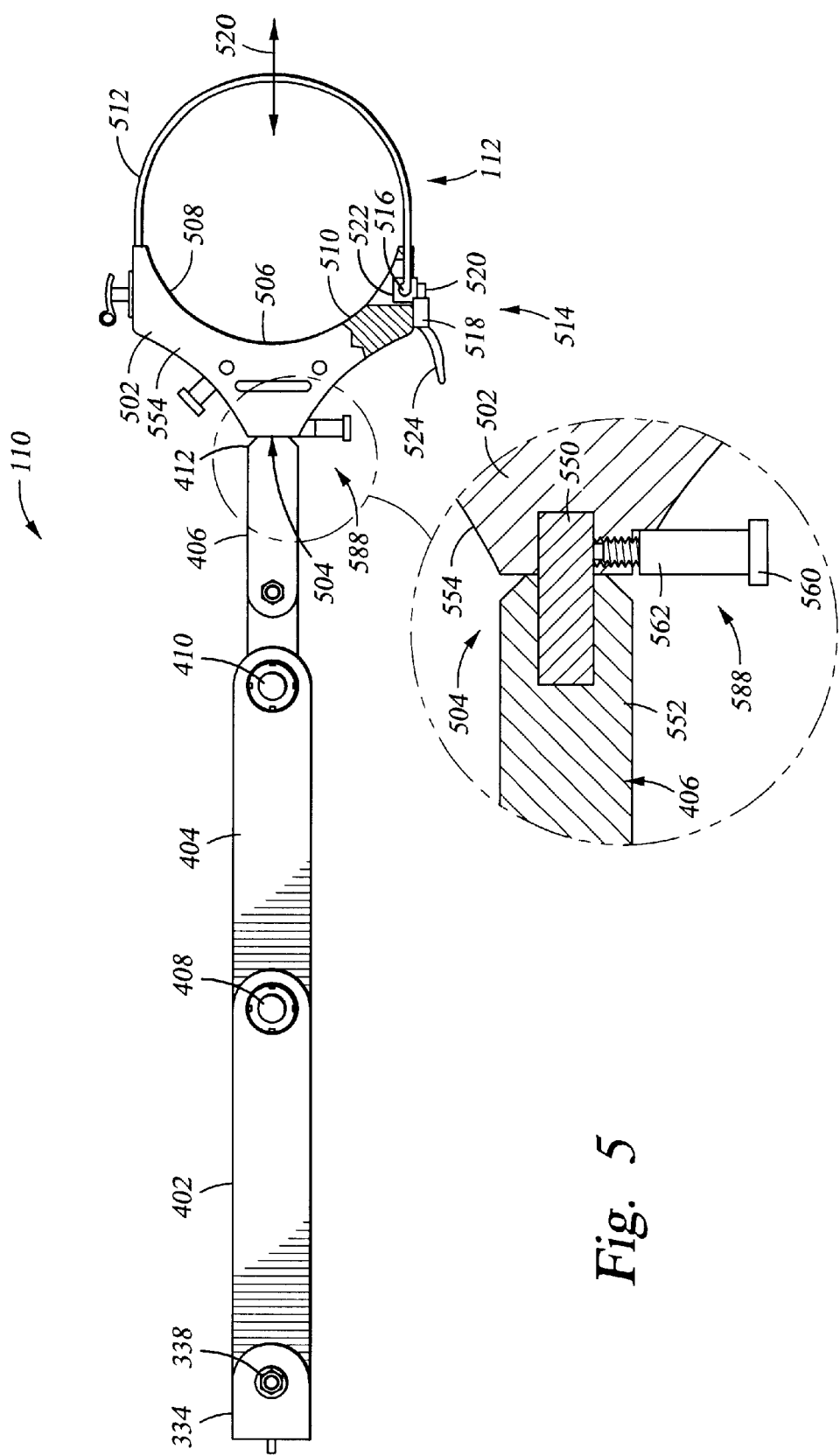
FIG. 5 is a top view of the linkage assembly of FIG. 1.
Figure 6:
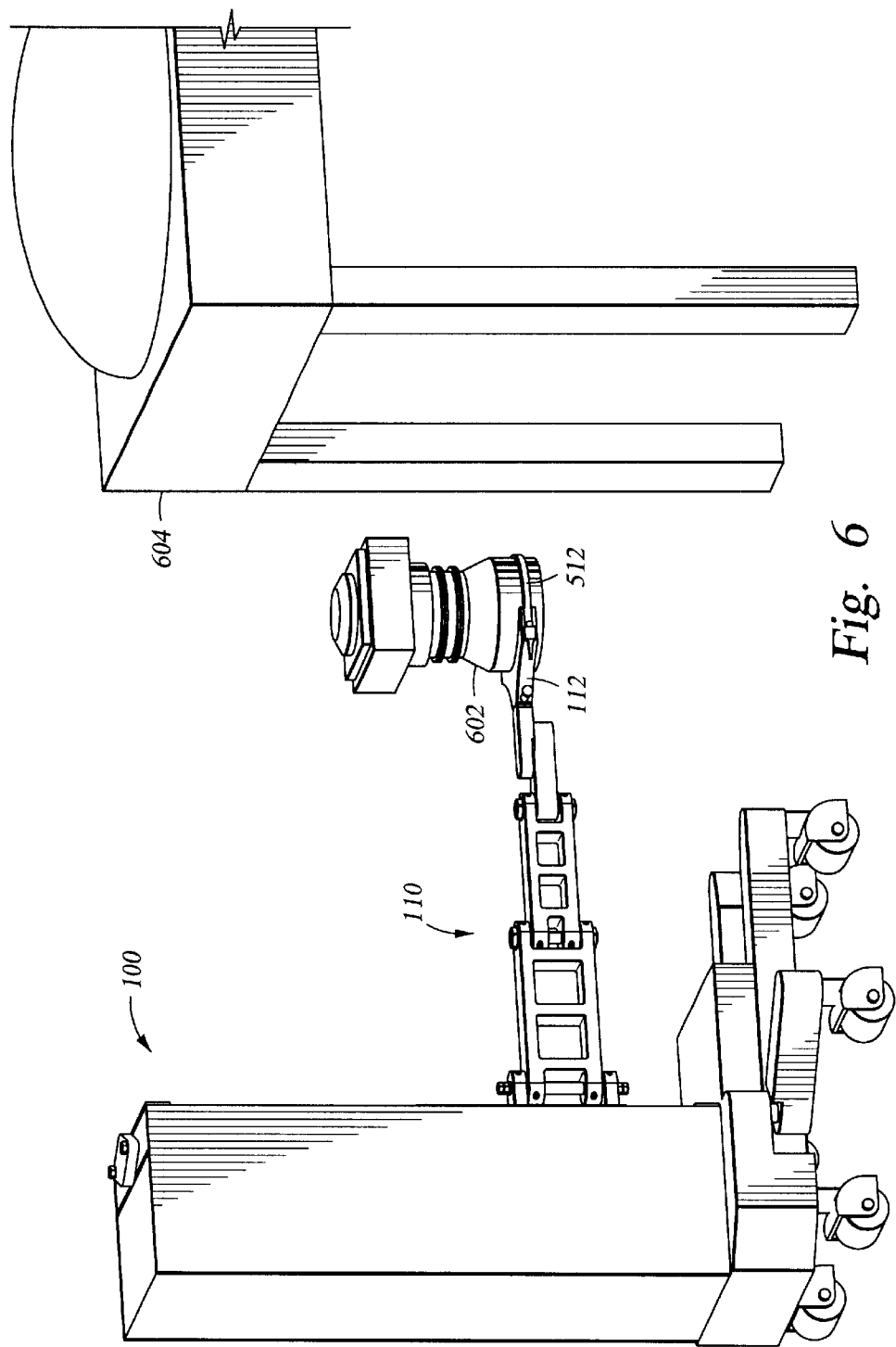
FIG. 6 depicts the lift assembly of FIG. 1 retaining a turbomolecular pump.

Referring to FIGS. 5 and 6, the gripper assembly 112 may be configured to retain various objects. In the embodiment depicted in FIG. 6, the gripper assembly 112 is configured to retain a turbomolecular pump 602 typically utilized in 200 and 300 mm semiconductor processing operations. The gripper assembly 112 generally includes a yoke 502 coupled to the wrist 412. The wrist 412 generally includes a portion that interfaces with the third link 406 and may optionally include a universal joint 504 that allows rotation of the gripper assembly 112 about a horizontal axis.

In one embodiment, the universal joint 504 generally includes a stationary portion 552 coupled to the third link 406 and a mounting portion 554 coupled to the yoke 502. A shaft 550 generally is disposed between the stationary portion 552 and the mounting portion 554 to allow relative rotation therebetween.

In one embodiment, the shaft 550 is fixed to the stationary portion 552 and configured to allow rotation of the mounting portion 554. A locking mechanism 588 is typically disposed on the mounting portion 554 to fix the relative orientation of the stationary portion 552 relative the mounting portion 554. In one embodiment, the locking mechanism 588 comprises a knob 560 having a shaft 562 which threads into the mounting portion 554 and interfaces with (i.e., urges against) the shaft 550. As the knob 560 is turned to apply a force against the shaft 550, the angular rotation of the mounting portion 554 and gripper assembly 112 may be fixed. Alternative locking mechanisms are contemplated.

The yoke 502 is generally a y-shaped member having a center portion 506 coupled to the mounting portion 554. A first end 508 and a second end 510 of the yoke 502 typically forms a curved surface utilized to support a portion of an object such as the turbomolecular pump 602 depicted in FIG. 6. A band 512 extends from the first end 508 and is typically removably attached to the second end 510. The second end 510 includes an attachment mechanism 514 that is adapted to move an attachment point of the band 512 relative to the second end 510 to urge the object retained by the gripper assembly 112 securely against the yoke 502.

In one embodiment, the band 512 includes a hook 516 the interfaces with the tensioning mechanism 514. The tensioning mechanism 514 comprises a bracket 518 coupled to the second end 510 having a threaded member 520 passing therethrough. One end of the threaded member 520 includes a bar or other mechanism 522 that is adapted to interface with the hook 516 coupled to the end of the band 512. The opposite end of the threaded member 520 contains a latch or knob 524 which, when thrown or turned, moves the bar 522 and band 512 along the yoke 502, and thereby reducing the distance between the band 512 and center portion 506 of the yoke 502.

The lift assembly 100 is typically utilized within the cleanroom whenever positioning of heavy or awkward objects is desired. For example, the lift assembly 100 may be used to maneuver a turbomolecular pump proximate a semiconductor process chamber for service and/or replacement. Typically the lift assembly 100 is moved across the cleanroom in a disassembled state in order to avoid damaging to processing equipment, facility supply lines and for ease of movement. In the disassembled state, the linkage assembly 110 is disconnected from the remainder of the lift assembly 100 thus reducing the area need to maneuver the lift assembly 100. The carriage shaft assembly 338 remains secure between the mounting brackets 334, 336.

Referring back to FIGS. 4A–D, the lift assembly 110 typically is separated into the three links 402, 404, 406. The first and second linkage shaft assemblies 408, 410 remain respectively secured by the first and second links 402, 404 to minimize the complexity of the disassembly and assembly process while ensuring shaft alignment is maintained. As the larger links may weigh in excess of about 20 pounds, separating the links 402, 404, 406 allows a single service technician to handle the links with minimal or no assistance, thus advantageously minimizing the presence of persons in the cleanroom.

Once the lift assembly 100 is maneuvered into a desired position, the first link 404 is fastened to the carriage shaft assembly 338 by fastening the end caps 438A, 444A to the first link 402 thereby coupling the sleeve 354 of the carriage shaft assembly 338. The second link 404 is then fastened to the first linkage shaft assembly 408 held by the first link 402 and the third link 406 is fastened to the second linkage shaft assembly 410 held by the second link 404 in a similar fashion. Lastly, the gripper assembly 112 is secured to the third link 112. Optionally, the outriggers 12 are extended to counter any tipping moment. The lift assembly 100 is now ready for use.

Although the teachings of the present invention that have been shown and described in detail herein, those skilled in the art can readily devise other varied embodiments that still incorporate the teachings and do not depart from the scope and spirit of the invention.

What is claimed is:

1. A cleanroom lift comprising:

a) a vertically movable carriage;

b) a carriage shaft assembly having a rotating member and at least one preloaded bearing having an inner race disposed over a portion of the rotating member and an outer race coupled to the carriage;

c) a first link having a single piece construction comprising an upper member and a lower member coupled by at least one traverse member, at least one of the upper and lower members having a first end coupled to the rotating member of the carriage shaft assembly;

d) a first linkage shaft assembly having a rotating member and at least one preloaded bearing having an inner race disposed over a portion of the rotating member and an outer race coupled to a second end of at least one of the upper and lower members the first link;

e) a second link having a single piece construction comprising an upper member and a lower member coupled by at least one traverse member, at least one of the upper and lower members having a first end coupled to the rotating member of the first linkage shaft assembly; and f) a gripper coupled to the second link.

2. The cleanroom lift of claim 1 further comprising:

a second linkage shaft assembly having rotating a member and at least one preloaded bearing having an inner race disposed over a portion of the rotating member and an outer race coupled to a second end of at least one of the upper and lower members the first link; and a third link having a first end coupled to the rotating member of the second linkage shaft assembly and a second end coupled to the gripper.

3. The cleanroom lift of claim 1 further comprising:

a base;

a plurality of castors coupled to the base;

a vertical support assembly coupled to the base; and an actuator between the vertical support assembly and the carriage, the actuator adapted to move the carriage relative to the vertical support assembly.

4. A cleanroom lift comprising:
a) a vertically movable carriage;
b) a carriage shaft assembly comprising:
   a carriage shaft;
   an upper preloaded bearing having an inner race disposed over a first end of the carriage shaft and an outer race coupled to the carriage; and
   a lower preloaded bearing having an inner race disposed over a second end of the carriage shaft and an outer race coupled to the carriage;
c) a linkage assembly comprising:
   a first link having a first end and a second end,
   a second link having a first end and a second end,
   a first linkage shaft assembly rotatably coupling the second end of the first link and the first end of the second link,
   at least one first link first end cap coupled to the first end of the first link and clamping the carriage shaft therebetween;
   at least one first link second end cap coupled to the second end and clamping the first linkage shaft assembly therebetween;
   at least one second link first end cap coupled to the first end of the second link and clamping the first linkage shaft assembly therebetween; and
d) a gripper assembly coupled to the second link of the linkage assembly.

5. The cleanroom lift of claim 4 further comprising:
   a third link having a first end coupled to the gripper assembly, and
   a second linkage shaft assembly rotatably coupling the second end of the second link to a second end of the third link.

6. The cleanroom lift of claim 4, wherein the first linkage shaft assembly further comprises:
   a linkage shaft;
   an upper preloaded bearing having an inner race disposed over a first end of the linkage shaft and an outer race clamped to the second assembly; and
   a lower preloaded bearing having an inner race disposed over a second end of the linkage shaft and an outer race clamped to the second assembly.

7. The cleanroom lift of claim 5, wherein the linkage assembly further comprises:
   at least one second link second end cap coupled to the second end of the second link and clamping the second linkage shaft assembly therebetween; and
   at least one second link first end cap coupled to the first end of the second link and clamping at least one bearing that is coupled to the third link.

8. The cleanroom lift of claim 4, wherein the first link further comprises:
   an upper member;
   a lower member; and
   at least one traverse members coupling the upper and lower members.

9. The cleanroom lift of claim 8, wherein the upper member and first link first end cap form a hole therebetween that clamps the upper bearing of the carriage shaft assembly.

10. The cleanroom lift of claim 9, wherein the lower member and a second link first end cap form a hole therebetween that clamps the lower bearing of the carriage shaft assembly.

11. The cleanroom lift of claim 4 further comprising:
a base;
a plurality of casters coupled to the base;
a vertical support assembly coupled to the base; and
an actuator between the vertical support assembly and the carriage, the actuator adapted to move the carriage relative to the vertical support assembly.

12. The cleanroom lift of claim 4, wherein the upper and lower bearings of the carriage shaft assembly are tapered roller bearings.

13. A cleanroom lift comprising:
a) a vertically movable carriage;
b) a carriage shaft assembly comprising:
   a carriage shaft;
   an upper preloaded bearing having an inner race disposed over a first end of the carriage shaft and an outer race coupled to the carriage; and
   a lower preloaded bearing having an inner race disposed over a second end of the carriage shaft and an outer race coupled to the carriage;
(c) a gripper assembly; and
(d) a linkage assembly comprising:
   a first link having a single piece construction comprising an upper member and a lower member coupled by at least one traverse member, the upper and lower members each having a first end and a second end,
   a second link having a single piece construction comprising an upper member and a lower member coupled by at least one traverse member, the upper and lower members each having a first end and a second end;
   a third link having a first end and a second end coupled to the gripper assembly;
   a first linkage shaft assembly rotatably coupling the second end of the first link and the first end of the second link;
   a second linkage shaft assembly rotatably coupling the second end of second link to the first end of the third link, each of the first and second linkage shaft assemblies having:
   i) a shaft;
   ii) an upper preloaded bearing having an inner race disposed over a first stepped end of the shaft and an outer race; and
   iii) a lower preloaded bearing having an inner race disposed over a second stepped end of the shaft and an outer race;
   at least one first link first end cap coupled to the first end of the first link and clamping the carriage shaft therebetween;
   at least one bearing receiving pocket formed in the second end of the first link and clamping the outer race of the upper bearing of the first linkage shaft assembly therein;
   at least one second link first end cap coupled to the first end of the second link and clamping the shaft of the first shaft assembly therebetween;
   at least one bearing receiving pocket formed in the second end of the second link and clamping the outer race of the upper bearing of the second linkage shaft assembly therein; and
   at least one third link first end cap coupled to the first end of the third link and clamping the shaft of the second shaft assembly therebetween;
(d) a gripper assembly coupled to the second link of the linkage assembly.

14. The cleanroom lift of claim 13, wherein the upper member of the first link has a first bearing receiving pocket formed therein that clamps the upper bearing of the first shaft assembly, and the lower member of the first link has a second bearing receiving pocket formed therein that clamps the lower bearing of the first shaft assembly.

15. The cleanroom lift of claim 14 further comprising:
a base;
a plurality of castors coupled to the base;
a vertical support assembly coupled to the base; and
an actuator between the vertical support assembly and the carriage, the actuator adapted to move the carriage relative to the vertical support assembly.

16. The cleanroom lift assembly of claim 13, wherein the gripper assembly further comprises:
a yoke coupled to the third link;
a band coupled to the yoke at a first send; and
a latching mechanism coupled to the yoke and adapted to urge the band towards the yoke.

17. A cleanroom lift comprising:
a) a vertically movable carriage;
b) a carriage shaft assembly comprising:
a carriage shaft;
an upper preloaded bearing having an inner race disposed over a first end of the carriage shaft and an outer race coupled to the carriage; and
a lower preloaded bearing having an inner race disposed over a second end of the carriage shaft and an outer race coupled to the carriage;
c) a gripper assembly; and
d) a linkage assembly comprising:
a first link having a single piece construction having a first end and a second end,
a second link having a single piece construction having a first end and a second end;
a third link having a first end and a second end coupled to the gripper assembly;
a first linkage shaft assembly rotatably coupling the second end of the first link and the first end of the second link;
a second linkage shaft assembly rotatably coupling the second end of second link to the first end of the third link, each of the first and second linkage shaft assemblies having:
i) a shaft;
ii) an upper preloaded bearing having an inner race disposed over a first stepped end of the shaft assembly and an outer race; and
iii) a lower preloaded bearing having an inner race disposed over a second stepped end of the shaft assembly and an outer race;
at least one first link end cap coupled to the first end of the first link and clamping the carriage shaft therebetween;
at least one bearing receiving pocket formed in the second end of the first link and clamping the outer race of the upper bearing of the first linkage shaft assembly therein;
at least one second link end cap coupled to the first end of the second link and clamping the shaft of the first shaft assembly therebetween;
at least one bearing receiving pocket formed in the second end of the second link and clamping the outer race of the upper bearing of the second linkage shaft assembly therein; and
at least one third link end cap coupled to the first end of the third link and clamping the shaft of the second shaft assembly therebetween.

* * * * *